United States Patent
Klaassen et al.

(10) Patent No.: US 6,671,113 B2
(45) Date of Patent: Dec. 30, 2003

(54) CHARACTERISTICALLY TERMINATED WRITE DRIVER WITH COMPENSATION FOR MAGNETIC RESPONSE AND METHOD THEREFOR

(75) Inventors: Klaas Berend Klaassen, San Jose, CA (US); Jacobus Cornelis Leonardus van Peppen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 09/798,945

(22) Filed: Mar. 6, 2001

(65) Prior Publication Data

US 2002/0126409 A1 Sep. 12, 2002

(51) Int. Cl.$^7$ ................................. G11B 5/09
(52) U.S. Cl. ............... 360/46; 360/68; 360/61; 327/110
(58) Field of Search ............... 360/68, 46, 67, 360/61, 66; 327/108, 110

(56) References Cited

U.S. PATENT DOCUMENTS

| | | |
|---|---|---|
| 5,287,231 A | 2/1994 | Shier et al. |
| 5,291,347 A | 3/1994 | Ngo et al. |
| 5,612,828 A | 3/1997 | Brannon et al. |
| 5,790,336 A | 8/1998 | Voorman et al. |
| 5,822,141 A | 10/1998 | Chung et al. |
| 5,869,988 A | 2/1999 | Jusuf et al. |
| 6,011,423 A | 1/2000 | Baizley et al. |
| 6,040,954 A | 3/2000 | Tanghe |
| 6,297,921 B1 * | 10/2001 | Price, Jr. et al. ............ 360/68 |
| 6,512,646 B1 * | 1/2003 | Leighton et al. ............ 360/46 |

* cited by examiner

*Primary Examiner*—Alan T. Faber
(74) *Attorney, Agent, or Firm*—Marc D. McSwain, Esq.; McGinn & Gibb, PLLC (57) ABSTRACT

A method (and magnetic recording circuit structure) for write drivers to reduce the reversal time for the current through the inductive recording head, includes a write driver output stage providing a write signal output with a write signal source strength $S_O$, a magnetic write head with a write signal input essentially equal to strength $S_O$, and an interconnect circuit having a characteristic impedance $Z_O$ coupled to the write signal output of the write driver output stage and the magnetic write head. The write driver output stage preferably includes a source-side termination circuit having output impedance $Z_S$, wherein the source-side termination circuit output impedance $Z_S$ is substantially equal to $Z_O$ and the source strength $S_O$ of the write driver at the input of the interconnect circuit is temporarily enlarged after every polarity reversal of the write signal for a predetermined time duration $\Delta t$.

23 Claims, 6 Drawing Sheets

PRIOR ART

FIGURE 1(a)

PRIOR ART

FIGURE 1(b)

PRIOR ART

FIGURE 2(a)

PRIOR ART

CHARACTERISTICALLY TERMINATED WRITE DRIVER WITH COMPENSATION FOR MAGNETIC RESPONSE AND METHOD THEREFOR

BACKGROUND OF THE INVENTION

1. Field of the Invention

The present invention generally relates to a technique of using an inductive recording head to store information onto a magnetic medium, and in particular to circuits for reducing the current reversal time of the current through the inductive recording head for write drivers having an H-type configuration.

2. Description of the Related Art

Typically, a conventional H-type current write driver drives a magnetic recording head via a suspension interconnect. Because of the relatively low data rates, the current reversal times in the magnetic recording head are relatively large with respect to the echo-return time (e.g., twice the "time of flight" of the interconnect) which, for an industry standard interconnect in a 3.5 inch drive has a length of 5 cm, is approximately 500 picoseconds. As a result, when the next current reversal arrives at the head, the echoes of the previous current reversal have dissipated enough not to cause a noticeable transition shift in the written data.

However, the ever increasing data rates require the current reversal time to be much smaller now to allow for the lower minimum time interval T between two adjacent current reversals commensurate with the higher data rate (e.g., T=1/DR, where DR is data rate in bits/sec). This minimum time interval is a so-called "bit cell time window". With these higher data rates, T is becoming so small that the echoes of a previous current reversal may not have dissipated enough at the next current reversal, thereby causing a timing shift in the written data (timing distortion).

Figure 1A:
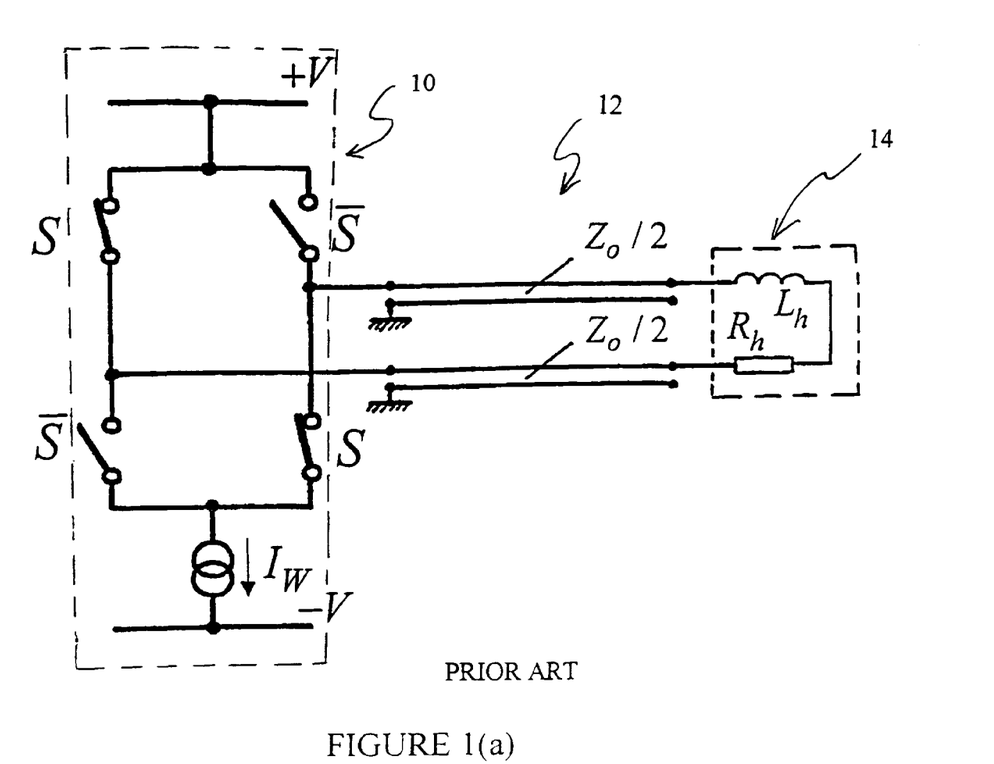
FIG. 1(a) is a schematic diagram of a conventional write driver having a H-type configuration.

The conventional write configuration is illustrated in FIG. 1(a), and includes a write driver 10, an interconnect 12 typically of the integrated lead suspension (ILS) type and having characteristic impedance $Z_O$, and a magnetic recording head 14 having write current $I_W$ and equivalent inductive element $L_h$ and resistive element $R_h$. A cross section of the ILS type of interconnect is illustrated in FIG. 1(b).

The write driver 10 is configured in an "H" topology with the write head 14 at the cross-bar of the "H". When a data pulse is of one polarity the pair of switches S are closed to permit current flow in one direction in the write head. An opposite polarity data pulse causes switches S_bar to close to permit current flow in the opposite direction in the write head.

Figure 1B:
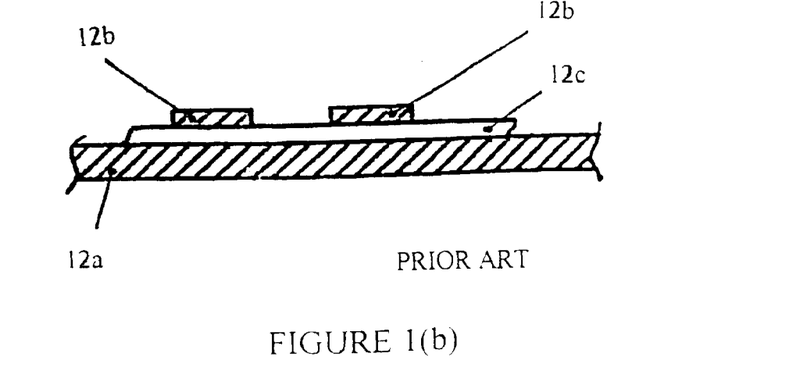
FIG. 1(b) is a cross section view of the conventional Integrated Lead Suspension (ILS) type of interconnect between the write driver and the write head.

As illustrated in the cross-sectional view of FIG. 1(b), the ILS structure typically includes a stainless steel suspension 12a, and traces 12b, 12b' separated by dielectric 12c, typically polymide with a typical dielectric coefficient $\epsilon_r \approx 2.7$. Traces 12b, 12b' have a typical separation of 50 μm and line width perhaps slightly larger. The signal power travels predominantly between trace 12b and the stainless steel suspension 12a and between trace 12b' and the suspension 12a. The signal power transfer by the transmission path formed by the 12b and 12b' trace can be neglected. Therefore, the two transmission lines in FIG. 1(a) (each with a single-ended characteristic impedance Z0/2, half the differential characteristic impedance Z0 of the ILS) are an adequate representation of the ILS.

Figure 2A:
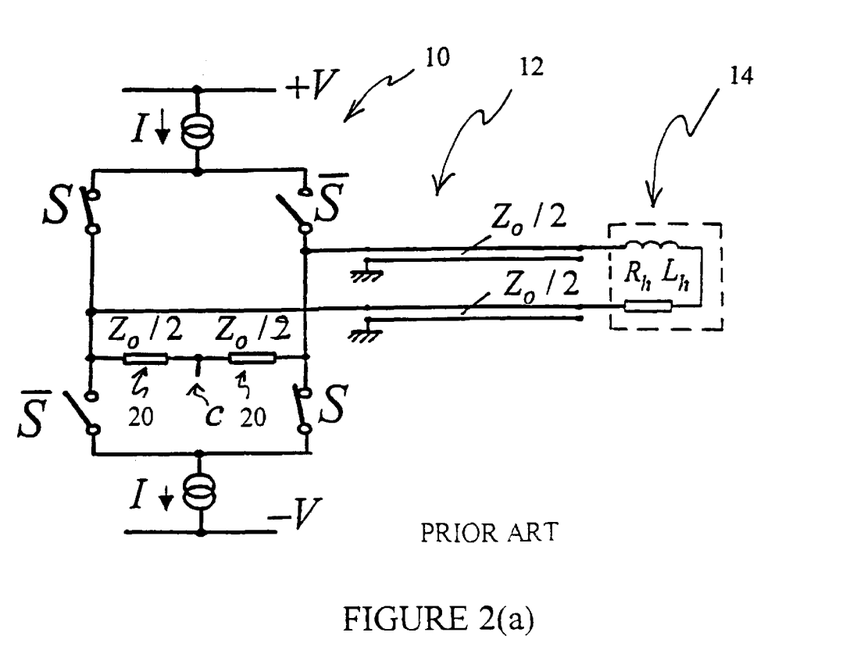
FIG. 2(a) is a schematic of a conventional source-terminated current write driver.
Figure 2B:
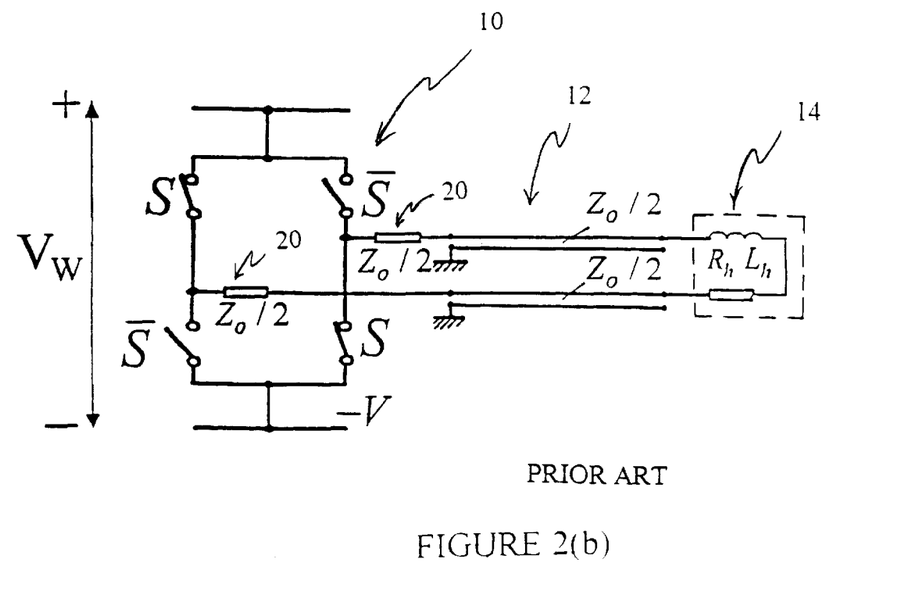
FIG. 2(b) is a schematic of a conventional source-terminated voltage write driver.

In the conventional systems, it is also known to source-terminate the ILS with an impedance substantially equal to the characteristic impedance of the ILS in order to absorb the reflections coming from the write head Because these reflections are no longer reflected back to the write head, they do not upset the timing of subsequent current reversals in the write head. FIG. 2(a) shows a conventional source-terminated current write driver including impedance matching resistors 20. FIG. 2(b) shows a conventional source-terminated voltage write driver.

The disadvantage of this conventional characteristic source termination scheme is that the achievable write head current reversal time is now determined by the inductance of the write head and the characteristic impedance of the ILS:

$$t_{10,90\%} = 2.2 L_h/(Z_O + R_h),$$

where $t_{10,90\%}$ is the reversal time interval from 10% to 90% of the steady state signal levels. $L_h$ is the head inductance; and $R_h$ is the head resistance.

As a result, using the rule of thumb that the bit cell time window T must be equal or larger than $2 \cdot t_{10,90\%}$, the maximum achievable data rate is given by:

$$\text{Data Rate}_{max} = (Z_O + R_h)/4.4 L_h [\text{bits/sec}]$$

With $L_h$=40 nH, $R_h$=15 Ω and $Z_O$=70 Ω, a maximum data rate is found of 480 Mbits/sec, or 60 Mbytes/sec.

To improve on this data rate, the characteristic impedance of the ILS could be made higher and/or the inductance of the head could be reduced. However, increasing the characteristic impedance of the ILS is difficult because the width of the traces becomes disappearingly small (for acceptable tolerances in the characteristic impedance of these lines about 80 Ω seems to be the maximum achievable impedance given the materials and dimensions used) Lowering the head inductance without increasing the write current to excessive levels has shown to be difficult. Such excessive write currents would require large area transistors in the write driver, associated with larger parasitics. This would slow down the write driver.

SUMMARY OF THE INVENTION

In view of the foregoing and other problems, it is, therefore, an object of the present invention to provide a structure and method for improving the write speed of an inductive recording head.

It is another object of the invention to achieve the shortest possible time interval between two write current reversals in an inductive recording head, as determined to be the current reversal time of the magnetic write head.

It is yet another object of the invention to achieve this shortened time interval by eliminating transition shift (e.g., timing distortion) in the written data caused by the reflections traveling along the interconnect between the write head and the write driver.

It is another object of the invention to achieve this shortened time interval by overcoming the limitation placed on the current reversal time by a relatively large ratio of head inductance and characteristic impedance of the interconnect by temporarily enlarging the source strength of the write driver immediately following each current reversal.

It is still another object of the invention to achieve the write driver source strength enlargement using a spiking circuit based on a current mirror circuit.

It is another object of the invention to reduce the write current reversal time by compensating for skin-effect losses in an Integrated Lead Suspension (ILS) type of interconnect between the write driver and the write head.

It is yet another object of the invention to achieve this skin-effect compensation by increasing the resistance value of the termination resistors used for suppressing echoes returning from the magnetic write head above the theoretical value.

In a first aspect of the present invention, a magnetic recording circuit is disclosed, having a magnetic write head receiving an input write signal having a first amplitude, and an enhancement circuit increasing a signal strength at the input of the magnetic write head above that first amplitude for a predetermined time interval immediately after every polarity reversal, where the predetermined time interval representing a transition period of the magnetic write head, defined as a time period for a current through the magnetic write head to reach a substantially steady state value following a polarity reversal In a second aspect of the present invention, a magnetic recording circuit is disclosed having a magnetic write head receiving an input write signal having a first amplitude, a write driver output stage providing the write signal as an output, the write driver output stage including a source-side termination circuit having output impedance $Z_S$, and an interconnect circuit having an input, an output, and a characteristic impedance $Z_O$, where the input of the interconnect circuit is coupled to the write signal output of the write driver output stage and the output of the interconnect circuit is coupled to the write signal input of the magnetic write head, and where $Z_S = \alpha \cdot Z_O$, $1 \leq \alpha \leq 1.3$.

In a third aspect of the present invention, a method is disclosed of increasing a data write rate in an inductive recording head by reducing a shortest possible write time interval between adjacent input data signal polarity reversals, including enhancing a signal strength at an input of the inductive recording head for a predetermined time interval after every polarity reversal, where the predetermined time interval is a transition period of the magnetic write head representing a time period for a current through the magnetic write head to reach a substantially steady state value following the polarity reversals.

In a fourth aspect of the present invention, a magnetic recording circuit is disclosed including a write driver output stage providing a write signal output with a write signal source strength $S_O$, the write driver output stage including a source-side termination circuit having output impedance $Z_S$, a magnetic write head having a write signal input essentially equal to strength $S_O$, and an interconnect circuit having an input, an output, and a characteristic impedance $Z_O$, the input of the interconnect circuit being coupled to the write signal output of the write driver output stage and the output of the interconnect circuit being coupled to the write signal input of the magnetic write head, where source strength $S_O$ of the write driver at the input of the interconnect circuit, is temporarily increased for a predetermined time duration $\Delta t$ after every polarity reversal of the write signal.

In a fifth aspect of the present invention, a magnetic recording apparatus is disclosed including a magnetic write head receiving an input write signal having a first amplitude, and an enhancement circuit increasing a signal strength at the input of the magnetic write head above that first amplitude for a predetermined time interval after every polarity reversal, where the predetermined time interval is a transition period of the magnetic write head representing a time period for a current through the magnetic write head to reach a substantially steady state value following a polarity reversal.

In a sixth aspect of the present invention, a magnetic recording apparatus is disclosed including a magnetic write head receiving an input write signal having a first amplitude, a write driver output stage providing the write signal as an output, the write driver output stage including a source-side termination circuit having output impedance $Z_S$, and an interconnect circuit having an input, an output, and a characteristic impedance $Z_O$, the input of said interconnect circuit being coupled to the write signal output of the write driver output stage and the output of the interconnect circuit being coupled to the write signal input of the magnetic write head, and where $Z_S = \alpha \cdot Z_O$, $1 \leq \alpha \leq 1.3$.

Thus, the present invention achieves the shortest possible time interval between two adjacent write current reversals in an inductive recording head by eliminating a transition shift (timing distortion) in the written data caused by the reflections traveling along the interconnect between the write head and the write driver using the uninterrupted source-termination of the write driver and overcoming the limitation placed on the current reversal time by a relatively large ratio of head inductance and characteristic impedance of the interconnect by temporarily enlarging the source strength of the write driver immediately following each current reversal. The shortest possible time interval, i.e., highest achievable data rate, is then only limited by the current reversal time that can be achieved with this temporarily enlarged source strength.

Further, with the invention, a method and circuitry are provided to increase the data rate beyond the above mentioned limitation by "spiking" the driver's source strength during the current reversals while maintaining, without interruption, the write driver source-terminated to the characteristic impedance of the ILS to suppress any echoes returning from the magnetic write head.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 3A:
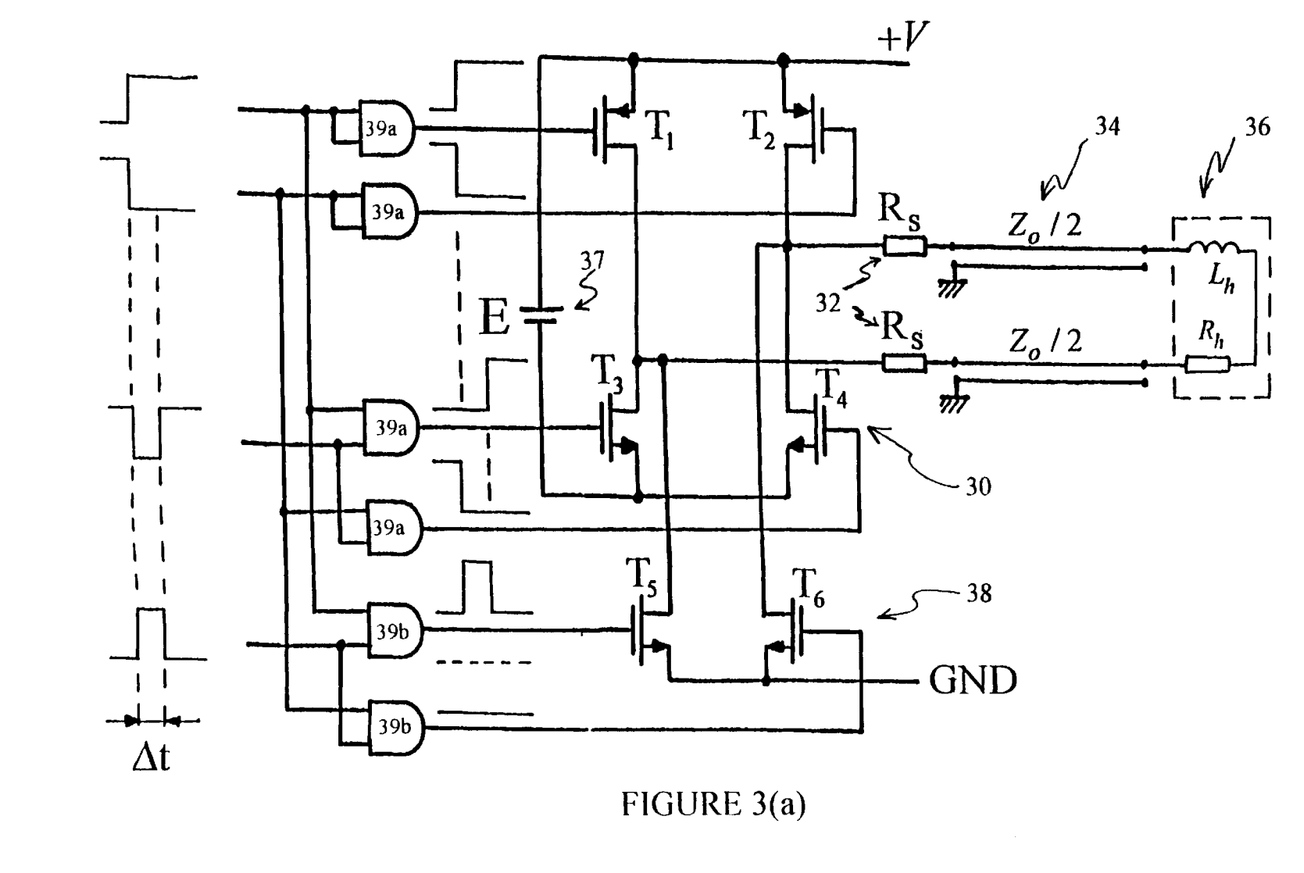
FIG. 3(a) illustrates an embodiment of the invention as a source-terminated CMOS voltage-type write driver.

Turning now to the drawings, preferred embodiments of the invention will be described. Generally, the principle of the invention is shown in FIG. 3(a). Similar to conventional write drivers this circuit includes a write driver 30, matching termination impedance 32, an ILS 34, and write head 36.

FIG. 3(a) shows a source-terminated voltage-type write driver 30 where during each input write data signal reversal the write driver output terminals are temporarily connected between the top and bottom power supply lines (in this example between+V and GND) by transistor switch pair $T_2,T_5$ or $T_1,T_6$, depending on the data polarity. This applies the full supply voltage V at the output of the driver 30 and provides the maximum possible write driver source strength enhancement without adding costly circuitry components such as voltage doublers. Note that the additional voltage above normal write voltage 37 is provided by turning on one of either transistor pair $T_5,T_6$ (shown as item 38). After a time interval $\Delta t$, made equal to the time it takes for the current through the head to reach the required steady-state value of the base-to-peak head current $I_W$ after the signal step traveling along the ILS reaches the head terminals, the write driver output terminals are then connected by $T_1,T_4$ or $T_2,T_3$ across a voltage source $E=I_w(2R_s+R_h)$, to the "normal" write current without enhancement. Gates 39a and 39b control the appropriate switching of transistors.

In the ideal (source-terminated) case, $R_S$ would be chosen equal to $Z_O/2$ (half the characteristic impedance of the ILS) to absorb any reflections coming from the magnetic write head. Skin effect losses in the ILS, however, will cause the current through the head to creep slowly to its final steady-state value. This effectively increases the write current reversal time.

Simulations show that this effect can be compensated for by increasing the termination resistors $R_S$ up to 30% higher than the characteristic terminated theoretical value, i.e., $R_S=\alpha \cdot Z0/2$, where $1 \leq \alpha \leq 1.3$. The specific value for parameter $\alpha$ depends on the actual skin effect losses of the interconnect This value can be determined by first measuring the ILS with a time domain reflectometer (TDR). From the TDR time response, a model for the ILS with the skin effect losses is derived. Next, a simulation is run for the head current reversal with a model of the write driver, the derived interconnect model, and the head model to determine the required value of $\alpha$ for this ILS/head combination.

Note that this over-termination to compensate for skin-effect losses is also applicable to all the following cases.

Figure 3B:
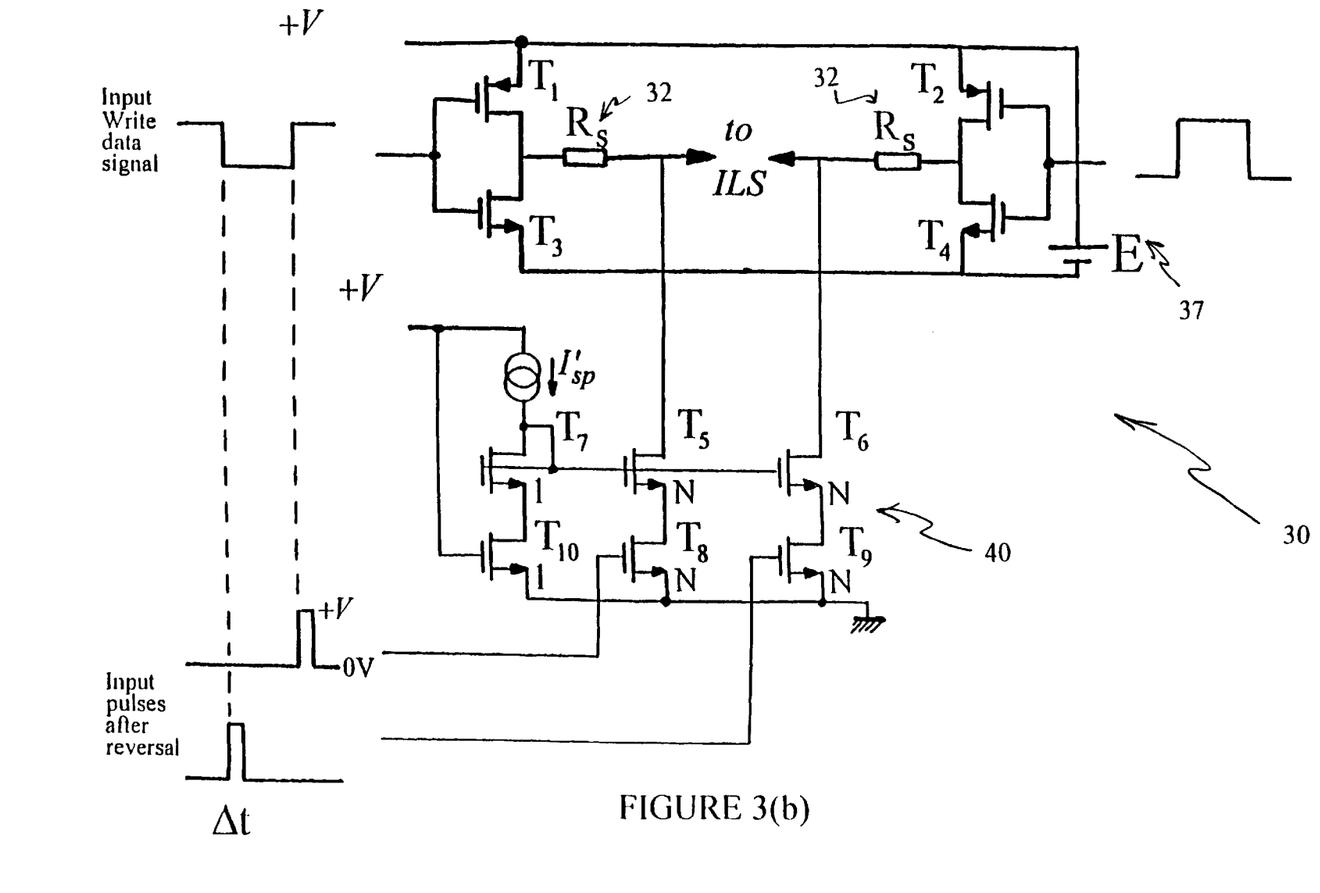
FIG. 3(b) illustrates an alternative embodiment of the invention as a source-terminated CMOS voltage-type write driver.

FIG. 3(b) shows a source-terminated CMOS voltage-type write driver 30 where the source termination resistors 32 connected to the CMOS switches $T_1, T_2, T_3, T_4$, are commutated between the positive and negative supply line of a unenhanced normal voltage source $E=I_w(2R_s+R_h)$. The write driver source strength enhancement is obtained by applying a short current pulse to the input terminals of the ILS directly after a write data reversal such that the voltage step across the ILS input terminals for this reversal is temporarily (for a time $\Delta t$) increased by switches $T_8$ or $T_9$. The temporary enhancement is achieved by the current mirror circuit 40. The amplitude of this current spike is given by $NI'_{SP}$, where N is the designed current ratio of transistors $T_5$ and $T_6$ relative to $T_7$, and $T_8$ and $T_9$ relative to $T_{10}$. The duration $\Delta t$ of this current pulse is equal to the time it takes for the current through the head to reach the required steady-state value of the base-to peak current $I_W$ after the voltage step traveling along the ILS reaches the head terminals.

The operation of this circuit is as follows: Assume that initially MOS switches $T_1$, and $T_4$ are conductive. MOS switches $T_2$ and $T_3$ are open. The voltage across the series chain of the two termination resistors $R_S$, the interconnect and write head impedance is then voltage E. In steady state, the current through this chain is $E/(2R_s+R_h)$ which is equal to the required base-to-peak write current $I_W$. For a current reversal, $T_2$ and $T_3$ are switched on and $T_1$, and $T_4$ are switched off reversing the voltage across this series chain and, consequently, reversing the steady state current $I_W$ through the write head. To speed up this reversal, at the moment of the reversal, $T_8$ is also switched on for a duration $\Delta t$. The MOS devices $T_7$, $T_5$, $T_{10}$ and $T_8$ form a current mirror which is switched on by turning on switch $T_8$. Because the MOS devices $T_7$ and $T_{10}$ are scaled to the MOS devices $T_5$ and $T_8$ (and $T_6$ and $T_9$) by a ratio 1 to N, the amplitude of the current mirror output pulse $I_{SP}$ (during period $\Delta t$) is N times the input current $I'_{SP}$. The voltage step at the left hand side of the ILS is then:

$$-(Z_O/(Z_O+2R_S))\cdot(E+NI'_{SP}R_S).$$

The voltage step at the right hand side of the ILS is:

$$+(Z_O/(Z_O+2R_S))\cdot E.$$

The total voltage step traveling along the ILS towards the write head is then:

$$(Z_O/(Z_O+2R_S))\cdot(2E+NI'_{SP}R_S),$$

and when this voltage step reaches the write head (at t=0), the initial current through the head is given by:

$$\Delta I_W(t)=2\cdot(Z_O(Z_O+2R_S))\cdot((2E+NI'_{SP}R_S)/(Z_O+R_h))\cdot(1-e^{-t/\tau}),$$

for $(0<\tau<\Delta t)$, with $\tau=L_h/(Z_O+R_h)$. The pulse time duration $\Delta t$ can be calculated from the equality $\Delta I_W(\Delta t)=2I_W$:

$$\Delta t=\tau \ln 1/(1-\beta),$$

where $\beta=A'\cdot B'\cdot C'$, and $A'=E/(2E+NI'_{SP}R_S)$, $B'=(Z_O R_h)\cdot(2R_S+R_h)$, and $C'=(Z_O+2R_S)/Z_O$. For a current reversal in the opposite direction, instead of switch $T_8$, switch $T_9$ is activated to speed up the reversal.

Figure 3C:
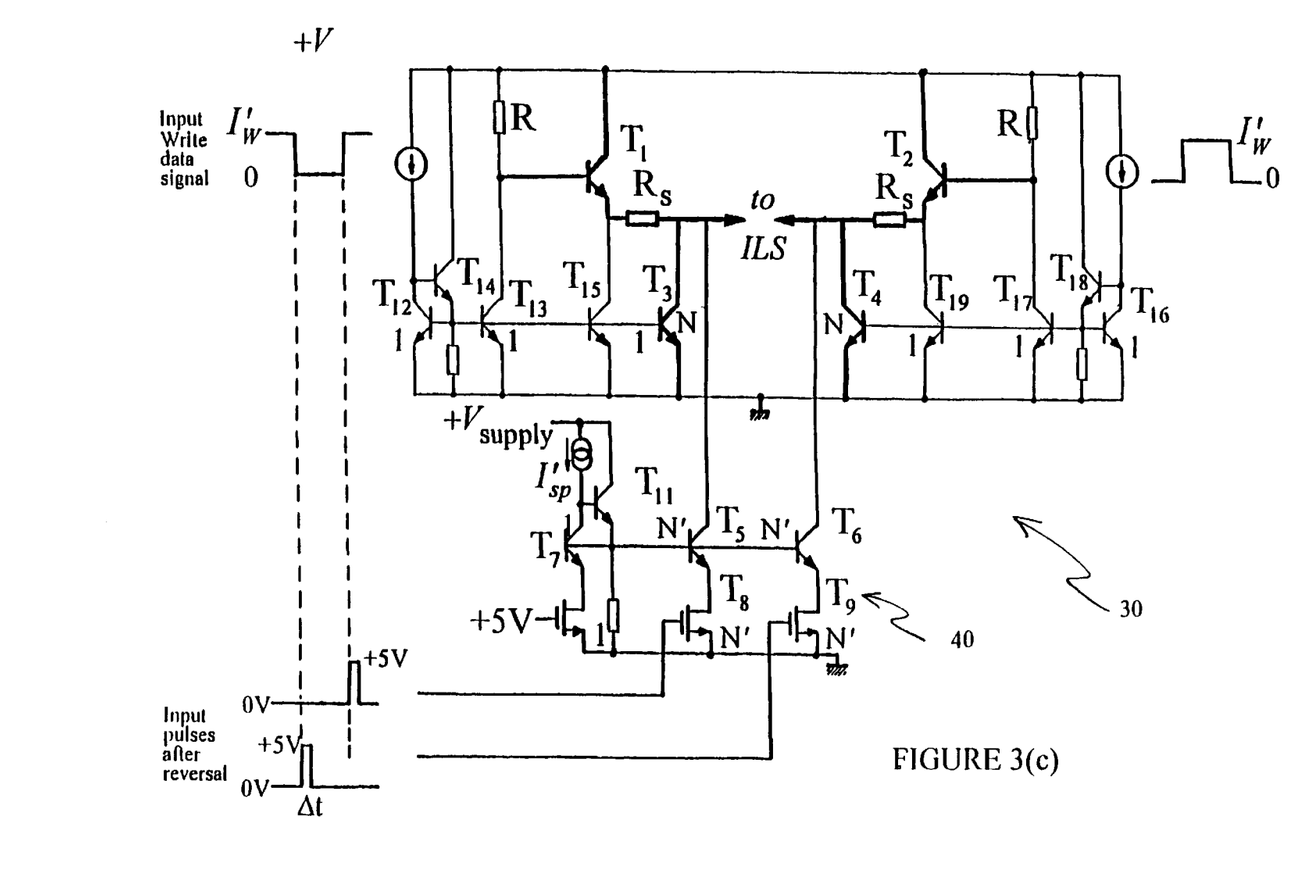
FIG. 3(c) illustrates an embodiment of the invention as a source-terminated BiCMOS voltage-type write driver.
Figure 3D:
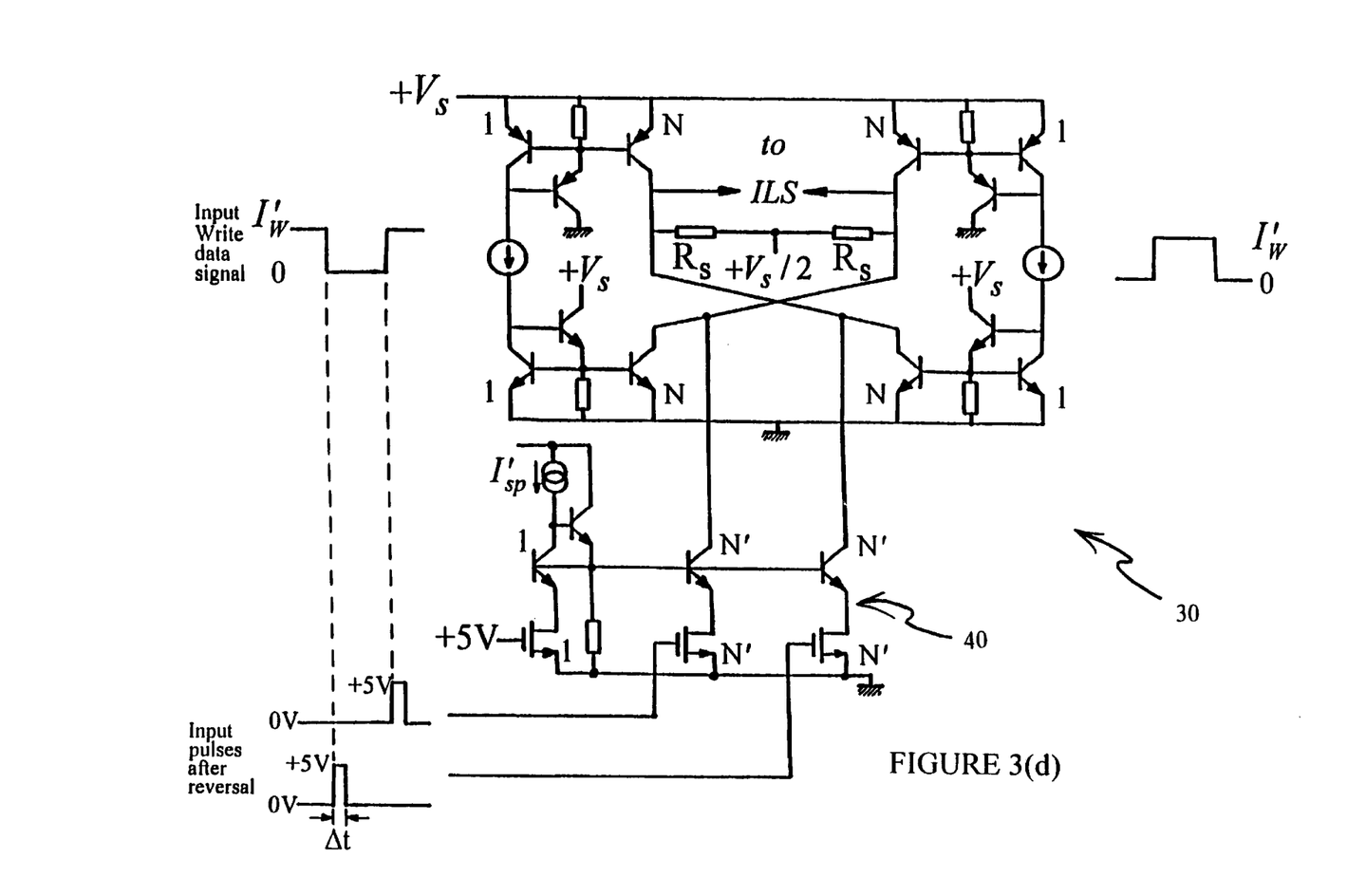
FIG. 3(d) illustrates an embodiment of the invention as a source-terminated current-type write driver.

FIG. 3(c) shows a source-terminated voltage-type write driver 30 according to the present invention designed in BiCMOS technology. $I_W$ is here equal to $NI'_W$, where $I'_W$ is the input write data current signal. The value of resistors R is chosen equal to $N(R_s+R_h)$. The write driver source strength enhancement is obtained here by applying a short current pulse to the input terminals of the ILS during a reversal such that the voltage step across the ILS input terminals at this reversal is increased. The amplitude of the associated current spike is given by $NI'_{SP}$. The duration at of this pulse is equal to the time it takes for the current through the head to reach the required steady-state value of the base-to peak head current $I_W$ after the voltage step traveling along the ILS reaches the head terminals.

The operation of this circuit is as follows. Assume that initially the input write data signal $I'_W$ is on the left hand side of the write driver, the right hand side data signal is zero. The current mirror formed by $T_{12}$, $T_{14}$ and $T_3$ draws an output current $NI'_W$ which is equal to the write current $I_W$. N is the ratio of the areas of transistors $T_3$ and $T_{12}$. This current flows through the interconnect through the head through the right hand $R_S$, and is delivered by the emitter follower $T_2$. The voltage drop between the emitter follower output of $T_2$ and the left hand side of the ILS due to this current is then $I_W(R_S+R_h)$. The current through the left hand resistor R is $I'_W$ (current mirror formed by transistors $T_{12}$, $T_{14}$, and $T_{13}$). The voltage across this resistor is $I'_W R$. The voltage across the right hand resistor R is zero. The voltage difference between the bases of the emitter followers $T_2$ and $T_1$ is then $I'_W R$ and as a result the voltage across the series chain formed by the two termination resistors $R_S$, the interconnect and the head impedance is also I'$_W$R. By choosing R=N(R$_S$+R$_h$), this voltage drop becomes I'$_W$N(R$_S$+R$_h$)=I$_W$(R$_S$+R$_h$).

That means that in this state there is no voltage drop across the left hand termination resistor R$_S$. The advantage of this is that the write driver is always source-terminated (emitter followers T$_1$ and T$_2$ are always on) but has only a voltage drop across one of the termination resistors instead of across both, resulting in a lower power supply voltage requirement. The operation of the source strength enhancement circuit 40 is the same as for the circuit in FIG. 3(*b*). The duration Δt is found to be:

Δ*t*=τ ln 1/γ, where γ=1−(*D*'·*E*'), and

*D*'=I$_W$·(Z$_O$+R$_h$)/(2I$_W$(2R$_S$+R$_h$)+N'I'$_{SP}$R$_S$),*E*'=(Z$_O$+2R$_S$)/Z$_O$.

FIG. 3(*d*) shows a source-terminated current-type write driver 30 where the write driver source strength enhancement 40 is obtained by connecting a short current pulse to the input terminals of the ILS such that the voltage step created across the ILS input terminals during a current reversal is increased. The duration Δt of this current pulse is equal to the time it takes for the current through the head to reach the required steady-state value of the base-to peak head current I$_W$ after the voltage step traveling along the ILS reaches the head terminals. I$_W$ is equal to NI'$_W$·(2R$_S$/(2R$_S$+R$_h$)) and the amplitude of the current spike is given by N'I'$_{sp}$.

In the above teachings, it was tacitly assumed that the reversal time of the magnetic field at the pole tips of the magnetic write head is the same as the head current reversal time. In an actual head, this field reversal time is given by: τ$_f$=(τ$^2_m$+(τ$_c$/α)$^2$)$^{1/2}$, where τ$_m$ is the intrinsic head magnetic reversal time, τ$_c$ is the write head current reversal time (10-90% values), and α is the apex saturation overdrive factor (1≦α≦2). That means that even if τ$_c$ is made small enough with the described invention, the magnetic field reversal time might still not be small enough to achieve the higher data rates because the yoke flux in the head magnetic circuit has not reached its steady state magnitude yet for the smallest time interval between transitions as is apparent from the non-zero value of τ$_m$. By temporarily (during a time interval Δt) increasing the write driver source strength at every reversal even further than mentioned above, we can compensate also for this slow response of the magnetic circuit of the write head. The source strength of the write driver can be enlarged by increasing the pulse width Δt in the disclosed methods, or, in FIG. 3(*a*) by increasing the power supply voltage Vs, and in FIGS. 3(*b*), (*c*) and (*d*) by increasing the amplitude of the current pulse, or a combination of both.

The invention as disclosed provides an increase in data rate write speed of a magnetic recording head without increasing the characteristic impedance of the ILS, reducing the inductance of the head, or increasing the write current using a larger driver amplifier. This shortest possible time interval between two write current reversals in an inductive recording head is achieved by eliminating transition shift (e.g., timing distortion) in the written data caused by the reflections traveling along the interconnect between the write head and the write driver, using the technique of temporarily spiking the write driver output immediately following each current reversal. By using current mirrors, no increase in amplifier size is required. Another technique improving the transition shift is the compensation for skin-effect losses in an Integrated Lead Suspension (ILS) type of interconnect between the write driver and the write head by increasing the resistance value of the termination resistors used for suppressing echoes returning from the magnetic write head above the theoretical value of simple impedance matching.

Although the present invention has been described in accordance with the embodiments shown one of ordinary skill in the art will readily recognize that there could be obvious variations to the embodiments. Those variations would be within the spirit and scope of the present invention. Accordingly, many modifications may be made by one of ordinary skill in the art without departing from the claims of this invention.

What is claimed is:

1. A magnetic recording circuit, comprising:
    a magnetic write head receiving an input write signal having a first amplitude; and
    an enhancement circuit increasing a signal strength at the input of said magnetic write head above said first amplitude for a predetermined time interval after every polarity reversal, said predetermined time interval representing a transition period of said magnetic write head, defined as a time period for a current through said magnetic write head to reach a substantially steady state value following said polarity reversal, said increasing of signal strength due to a current ratio in a current mirror circuit.

2. A magnetic recording circuit, comprising:
    a magnetic write head receiving an input write signal having a first amplitude;
    a write driver output stage providing said write signal as an output, said write driver output stage including a source-side termination circuit having output impedance Z$_S$; and
    an interconnect circuit having an input, an output, and a characteristic impedance Z$_O$, said input of said interconnect circuit being coupled to said write signal output of said write driver output stage and said output of said interconnect circuit being coupled to said write signal input of said magnetic write head,
    wherein Z$_s$=α·Z$_O$, 1≦α≦1.3.

3. The magnetic recording circuit of claim 2, wherein 1≦α≦1.3.

4. A method of increasing a data write rate in an inductive recording head by reducing a shortest possible write time interval between adjacent input data signal polarity reversals, said method comprising:
    interconnecting an inductive recording head to a write driver output stage, using an interconnect circuit having a characteristic impedance Z$_O$, said write driver output stage having an output impedance Z$_S$, wherein Z$_S$=α·Z$_O$, 1≦α≦1.3; and
    enhancing a signal strength at an input of said inductive recording head for a predetermined time interval after every said polarity reversal,
    said predetermined time interval being a transition period of said magnetic write head, representing a time period for a current through said magnetic write head to reach a substantially steady state value following said polarity reversals.

5. A magnetic recording circuit, comprising:
    a write driver output stage providing a write signal output with a write signal source strength S$_O$, said write driver output stage including a source-side termination circuit having output impedance Z$_S$;
    a magnetic write head having a write signal input substantially equal to said strength S$_O$;
    an enhancement circuit comprising a current mirror; and an interconnect circuit having an input, an output, and a characteristic impedance $Z_O$, said input of said interconnect circuit being coupled to said write signal output of said write driver output stage and said output of said interconnect circuit being coupled to said write signal input of said magnetic write head, wherein said source strength $S_O$ of said write driver, at the input of the interconnect circuit, is temporarily increased by said enhancement circuit for a predetermined time duration $\Delta t$ after every polarity reversal of the write signal.

6. The magnetic recording circuit according to claim 5, wherein said predetermined time duration $\Delta t$ comprises a time period for a current through said magnetic write head to reach a substantially steady state value for the write current following said polarity reversals.

7. The magnetic recording circuit according to claim 5, wherein said a current mirror causes said increased source strength due to a current ratio of said current mirror.

8. A magnetic recording circuit, comprising:
 a write driver output stage providing a write signal output with a write signal source strength $S_O$, said write driver output stage including a source-side termination circuit having output impedance $Z_S$;
 a magnetic write head having a write signal input substantially equal to said strength $S_O$; and
 an interconnect circuit having an input, an output, and a characteristic impedance $Z_O$, said input of said interconnect circuit being coupled to said write signal output of said write driver output stage and said output of said interconnect circuit being coupled to said write signal input of said magnetic write head,
 wherein said source strength $S_O$ of said write driver, at the input of the interconnect circuit, is temporarily increased for a predetermined time duration $\Delta t$ after every polarity reversal of the write signal, and
 a value of said impedance $Z_S$ is chosen to lie in a range of substantially 1 to 1.3 times the value of said characteristic impedance $Z_O$.

9. The magnetic recording circuit according to claim 8, wherein said write driver output stage comprises a voltage-type write driver having an output impedance that is substantially less than the characteristic impedance $Z_O$ of the interconnect circuit, and the source-side termination circuit includes a resistance connected in series with said output impedance of said write driver output stage, such that said impedance $Z_S$ is formed by said impedance of the write driver output stage and said source-side termination circuit.

10. The magnetic recording circuit according to claim 9, wherein said source strength enlargement is achieved by temporarily increasing an output voltage of said write driver.

11. The magnetic recording circuit according to claim 10, wherein said output voltage increase is achieved by temporarily switching the write driver output terminals to the most positive and the most negative voltage supply lines of the driver.

12. The magnetic recording circuit according to claim 9, wherein said write driver comprises a differential write driver having two output terminals and said resistance forming said source-terminating circuit comprises two resistors of substantially equal value,
 wherein each of said two resistors is placed in series with one of said two output terminals of said differential write driver, and said write driver source strength is enlarged after a current reversal by a current pulse at one or both input terminals of said interconnect circuit, said current pulse having a polarity to shorten the current reversal through the write head.

13. The magnetic recording circuit according to claim 9, wherein at least one input terminal of said interconnect circuit is driven by a data signal switched current source with a magnitude substantially equal to the steady state write current, having a polarity such as to reduce the current flowing through at least one termination resistor, said current being sourced by the voltage write driver output, to substantially zero.

14. The magnetic circuit according to claim 8, wherein said write driver output stage comprises a current-type write driver having an output impedance that is greater than the characteristic impedance $Z_O$ of the interconnect circuit,
 wherein said source-side termination circuit comprises a series connection of two substantially equal resistances, connected in shunt across the output of said write driver, such that said output impedance $Z_S$ is formed by the impedance of the write driver output stage and the source-terminating circuit, and
 wherein the center point of said series circuit of said two resistors is connected to a bias voltage whose magnitude is substantially centered between the most positive and most negative supply voltage lines of the driver.

15. The magnetic recording circuit according to claim 14, said source strength of the write driver output stage is temporarily enlarged after a current reversal by increasing the current output of the write driver.

16. The magnetic recording circuit according to claim 8, wherein the duration $\Delta t$ of the enlargement of the write source strength is equal to the time interval for the write current to reach a substantially steady-state value after the write signal reversal step traveling along said interconnect circuit reaches the write head terminals.

17. The magnetic recording circuit according to claim 8, wherein the duration $\Delta t$ of the enlargement of the write source strength is equal to the time interval for a magnetic flux in a yoke to reach a substantially steady-state value after the write signal reversal traveling along said interconnect circuit reaches the write head terminals.

18. The magnetic recording circuit according to claim 8, wherein said interconnect circuit comprises an integrated lead suspension (ILS) structure.

19. The magnetic recording circuit according to claim wherein the duration $\Delta t$ of the enlargement of the write source strength is equal to the time interval for the magnetic write field to reach a substantially steady-state value after the write signal reversal traveling along said ILS reaches the write head terminals.

20. A magnetic recording apparatus comprising:
 a magnetic write head receiving an input write signal having a first amplitude; and
 an enhancement circuit increasing a signal strength at the input of said magnetic write head above said first amplitude for a predetermined time interval after every said polarity reversal, said enhancement circuit comprising a current mirror, said predetermined time interval being a transition period of said magnetic write head, representing a time period for a current through said magnetic write head to reach a substantially steady state value following said polarity reversal.

21. A magnetic recording apparatus, comprising:
 a magnetic write head receiving an input write signal having a first amplitude;
 a write driver output stage providing said write signal as an output, said write driver output stage including a source-side termination circuit having output impedance $Z_S$; and
 an interconnect circuit having an input, an output, and a characteristic impedance $Z_O$, said input of said interconnect circuit being coupled to said write signal output of said write driver output stage and said output of said interconnect circuit being coupled to said write signal input of said magnetic write head, wherein $Z_S = \alpha \cdot Z_O$, $1 \leq \alpha \leq 1.3$.

22. The magnetic recording apparatus of claim 20, wherein said increasing signal strength is due to a current ratio of said current mirror.

23. The magnetic recording apparatus of claim 21, further comprising:

an enhancement circuit increasing a signal strength at the input of said magnetic write head above said first level for a predetermined time interval immediately after every said polarity reversal.

* * * * *